United States Patent [19]
Willis

[11] Patent Number: 5,002,150
[45] Date of Patent: Mar. 26, 1991

[54] CONTROL FOR AUTOMOTIVE PASSIVE RESTRAINT SYSTEM WITH SEAT ADJUST DESENSITIZER

[75] Inventor: Timothy K. Willis, Northville, Mich.

[73] Assignee: Ford Motor Company, Dearborn, Mich.

[21] Appl. No.: 488,172

[22] Filed: Mar. 5, 1990

[51] Int. Cl.$^5$ .............................................. B60R 22/06
[52] U.S. Cl. ..................... 180/268; 280/804; 297/468; 297/483
[58] Field of Search ................. 180/268; 280/804, 808, 280/802; 297/216, 468, 470, 479, 480, 483

[56] References Cited

U.S. PATENT DOCUMENTS

| | | | |
|---|---|---|---|
| 4,384,735 | 5/1983 | Maeda et al. | 280/807 |
| 4,410,061 | 10/1983 | Terbayashi | 180/268 |
| 4,508,362 | 4/1985 | Higuchi | 280/804 |
| 4,730,844 | 5/1988 | Patterson | 280/804 |
| 4,807,715 | 2/1989 | Nagashima et al. | 180/268 |
| 4,848,795 | 7/1989 | Muraishi et al. | 180/268 |

Primary Examiner—Richard A. Bertsch
Attorney, Agent, or Firm—Mark Mollon; Paul K. Godwin

[57] ABSTRACT

A passive restraint system includes a torso belt automatically securing a vehicle occupant by moving from a forward position along a track to a rearward position. A belt carrier carries one end of the torso belt along the track while the other end of the torso belt is retained on a belt retractor. Adjustment of the location of a vehicle seat during travel of the torso belt could cause inadvertent latching of the retractor latching mechanism which results in stalling of the belt carrier. The present invention inhibits torso belt movement whenever the seat is adjusted to prevent such latching. When the seat adjustment is completed, the torso belt movement is resumed.

3 Claims, 3 Drawing Sheets

CONTROL FOR AUTOMOTIVE PASSIVE RESTRAINT SYSTEM WITH SEAT ADJUST DESENSITIZER

BACKGROUND OF THE INVENTION

The present invention relates in general to automotive passive restraint systems, and more particularly to a control circuit for a motorized passive restraint system.

The passive restraint system in a motor vehicle is responsible for providing automatic seatbelt protection to the vehicle occupants. The operation of the system is defined according to certain conditions such as the open or closed position of a door and the occurrence of certain events, such as the turning on of the vehicle ignition switch. As required, a torso belt of the passive restraint system will travel along a track from a forward position to a rearward position to secure an occupant. Other conditions and events will cause the torso belt to travel to the forward position to allow an occupant to enter or leave the vehicle.

The torso belt travels by means of a motor-driven carrier riding in a track along the door frame. As the belt carrier moves from the "A" pillar at the forward position toward the "B" pillar at the rearward position, the torso belt spools out of a retractor usually located at the base of the vehicle seat at the opposite side of the occupant from the door. The unspooling of the torso belt provides sufficient belt length to extend from the retractor, around the vehicle occupant, and to the rearward position of the belt carrier at the "B" pillar.

The belt retractor normally includes a latch mechanism which prevents unspooling of the belt during large accelerations or decelerations, such as in a collision. In the event that the retractor latching mechanism becomes engaged during movement of the belt carrier toward the rearward position, the belt carrier may stall somewhere between the forward and rearward positions since there will be insufficient slack of the torso belt to allow further movement of the belt carrier. This unintended latching of the retractor can occur, for example, when the vehicle occupant adjusts the seat position during belt carrier movement. The sudden movement of the occupant and the seat causes the retractor to latch, and in turn causes the belt carrier to stall. This occurrence is especially possible when the seat has a manual adjustment mechanism, but is also possible with power seats.

The belt carrier is driven by a reversible electric motor through a drivebelt which interconnects the belt carrier and the motor. In order to avoid overheating and possible damage to the electric motor during a stall condition, the motor control circuit includes a timer which limits the duration of time for which the motor is energized. A time period is selected which is longer than the normal amount of time required for travel of the belt carrier between opposite positions and is short enough to avoid motor damage in the event of a stalled condition.

When a stall condition occurs due to the latching of the belt retractor, the motor timer can time out thereby removing power from the motor and leaving the belt carrier stalled somewhere between the forward and rearward positions. Warning lights or audible signals are typically activated to indicate that the belt carrier has not reached the intended position.

In order to deactivate the warning signals in prior art systems, the vehicle occupant must reenergize the passive restraint system and bring the belt carrier into the proper position by either opening a vehicle door or turning the vehicle ignition off and on again.

SUMMARY OF THE INVENTION

It is a principal object of the present invention to provide a passive restraint system wherein the occurrence of a stall condition of the belt carrier is prevented.

It is a further object of the invention to provide method and apparatus for ensuring proper operation of a passive restraint belt system even when the seat location is being adjusted.

These and other objects are achieved by employing a carrier motor control circuit which includes a motor timer for determining an activation time for a belt drive motor. An adjustment sensor such as a contact switch detects the initiation of an adjustment of the seat location. In response to a signal from the sensor, a control logic circuit inhibits the motor timer stopping belt carrier movement. Thus, the torso belt will stop spooling out of the retractor while the seat is being adjusted, preventing inadvertent latching of the retractor mechanism. When the sensor signal indicates that the seat is no longer being adjusted, the control logic circuit retriggers the motor timer. The belt carrier is then driven to its proper location.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
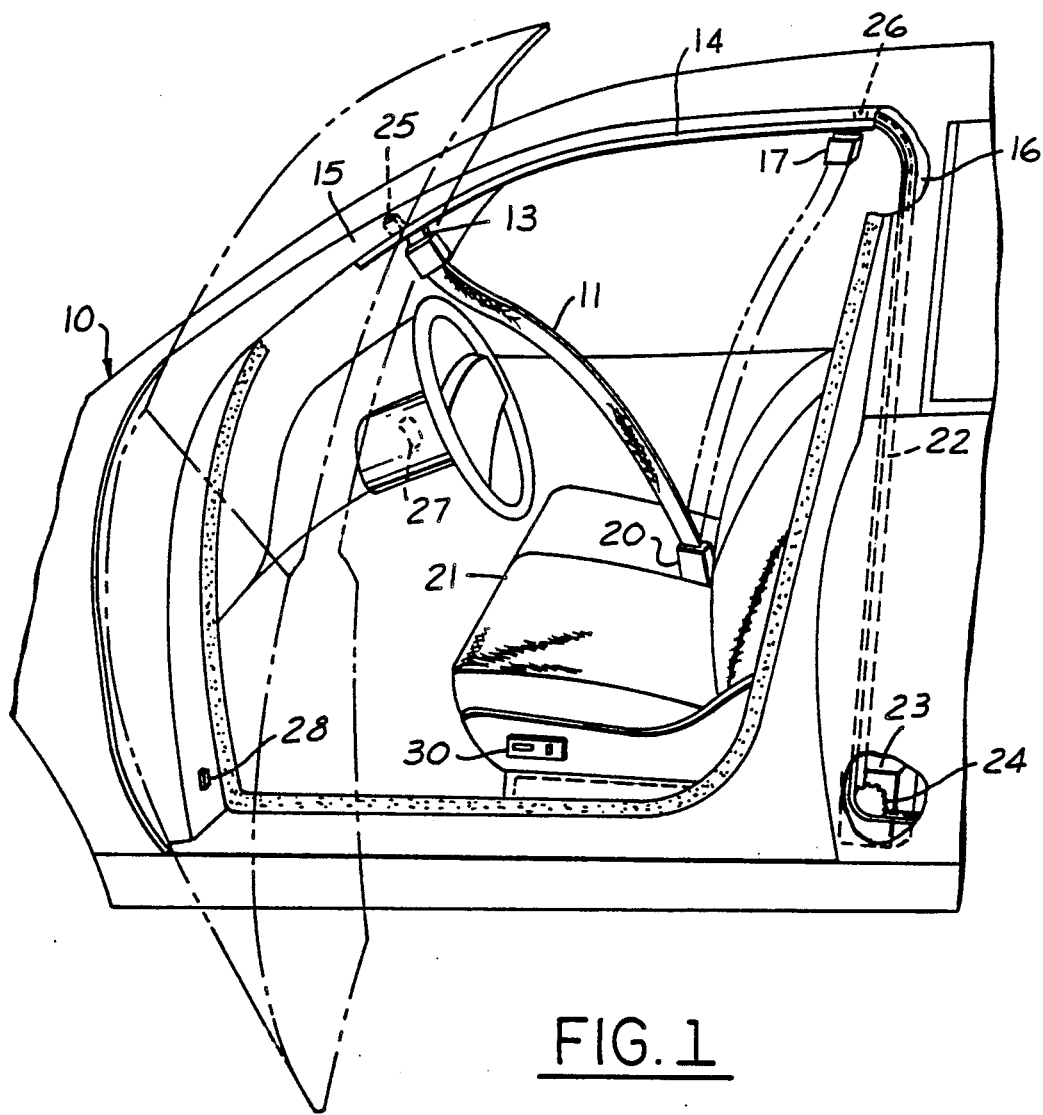
FIG. 1 is a perspective view of a vehicle including a passive restraint system and a power adjustable seat.

Referring to FIG. 1, a vehicle generally designated as 10 has a passive restraint belt system including a torso belt 11. At one end of torso belt 11 is a belt carrier 13. Belt carrier 13 is received for slidable movement in a track 14 which extends from the front or "A" pillar 15 to the rear or "B" pillar 16. Track 14 is affixed to the vehicle roof so that belt carrier 13 can be driven between a forward position at the "A" pillar and a rearward position at the "B" pillar as shown in phantom at 17.

The other end of torso belt 11 is received within a latchable retractor 20 which is secured to the floor of the vehicle near the bottom edge of a seat 21. Torso belt 11 is free to spool in or out from retractor 20 during movement of belt carrier 13 (except that belt 11 cannot spool out when retractor 20 becomes latched due to an acceleration exceeding a predetermined acceleration).

With an occupant located in seat 21 and with belt carrier 13 moving from a forward to a rearward position, torso belt 11 will be required to spool out from retractor 20 to provide sufficient length of the torso belt 11 to extend from retractor 20, around the occupant, and to the "B" pillar location of belt carrier 13.

Belt carrier 13 is connected to a drivebelt 22 within track 14. Drivebelt 22 extends through track 14 from belt carrier 13 to a motor 23 and engages a sprocket wheel 24 driven by motor 23. Thus, rotation of motor 23 in one direction causes movement of belt carrier 13 toward a rearward position and rotation of motor 23 in the opposite direction causes movement of belt carrier 13 toward a forward position. A pair of limit switches 25 and 26 sense the presence of belt carrier 13 at the forward and rearward positions, respectively.

The correct location of the passive restraint belt carrier at any moment is dependent on certain monitored conditions, including the state of an ignition switch 27 which may be either on or off. A door switch 28 provides a signal which indicates the open or closed position of its respective vehicle door. Furthermore, movement of belt carrier 13 is dependent on the occurrence of a trigger event which initiates belt carrier movement. Following a trigger event, a time period of limited duration begins during which motor 23 is energized.

Figure 1A:
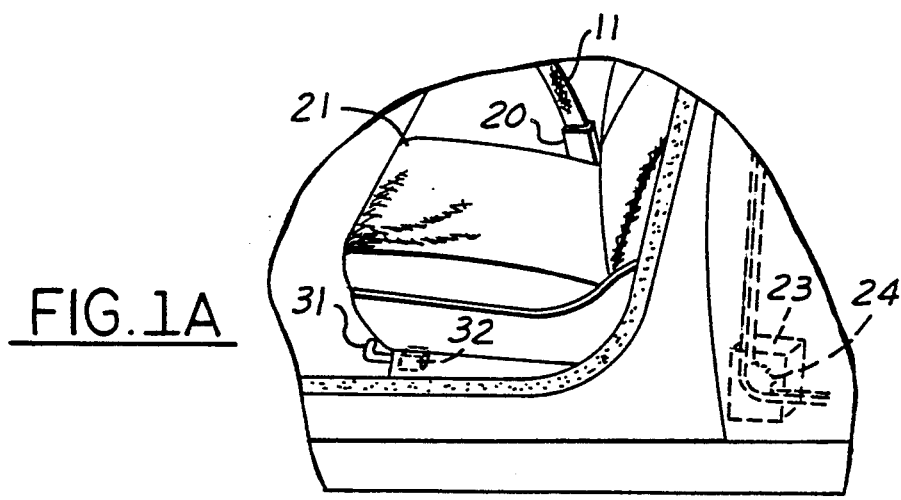
FIG. 1A is a perspective view showing a manually adjusted seat.

Seat 21 is adjustable to a location desired by an occupant. As shown in FIG. 1, seat 21 may be a power seat in which seat adjustment motors (not shown) are controlled by power seat switches 30. Switches 30 include a contact switch or sensor which provides a seat adjust signal whenever the power seat is being adjusted. The seat adjust signal is transmitted to a control module as described below. As shown in FIG. 1A, seat 21 can alternatively be manually adjustable. In that embodiment, seat 21 includes a manual release lever 31 and a sensor switch 32 which senses the position of lever 31 to provide the seat adjust signal.

In order to eliminate the possibility of a latched retractor mechanism causing a stalled belt carrier, the present invention provides means for deactivating motor 23 during adjustment of the position of seat 21. Once the seat adjustment is completed, the possibility of the belt retractor becoming latched is ended. Motor 23 is then reactivated and belt carrier 13 moves to the proper position at the "B" pillar.

Figure 2:
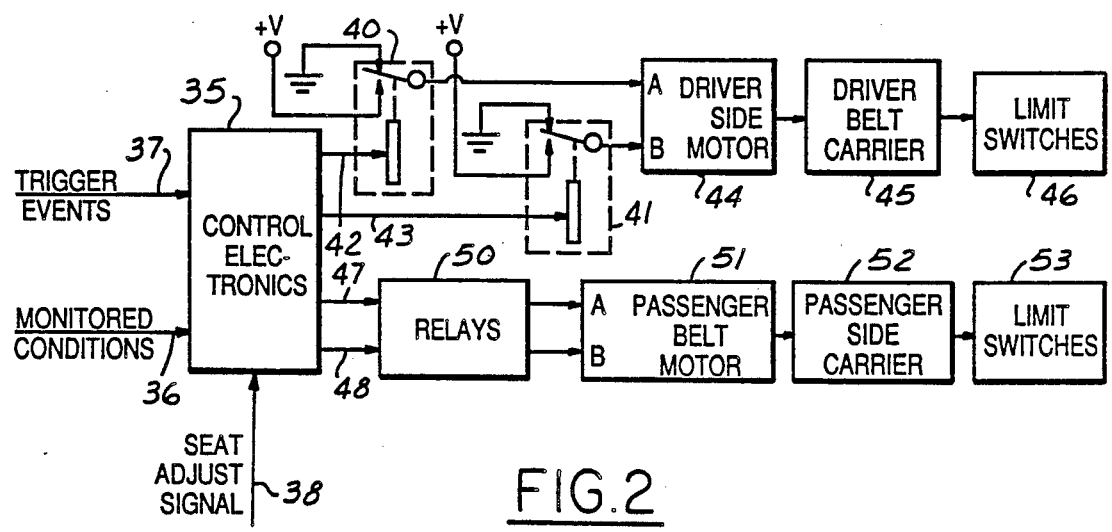
FIG. 2 is a schematic, block diagram of portions of the passive restraint system according to the present invention.

Turning now to FIG. 2, control electronics 35 controls the operation of the passive restraint belt drive motors for the driver side and passenger side as shown. Control electronics 35 senses a plurality of predetermined monitored conditions over a group of sensing lines 36, senses trigger events over a group of sensing lines 37, and monitors the occurrence of a seat adjust signal over a signal line 38.

The driver side of the passive restraint system includes a relay 40 connected to be energized by control electronics 35 on a control line 42 and a relay 41 connected to be energized by control electronics 35 on a control line 43. The outputs of relays 40 and 41 are connected to a driver side belt motor 44 which is a reversible dc motor, the direction of rotation depending on the energizing of the motor at its "A" input or its "B" input by relays 40 or 41, respectively. Motor 44 is mechanically connected to a driver side belt carrier 45 which engages limit switches 46 depending on its position at either end of a track. The outputs of limit switches 46 are included in the monitored conditions sensed over sensing lines 36.

In operation, the monitored conditions on signal lines 36 corresponding to the driver side of the passive restraint system causes control electronics 35 to select the one of relays 40 or 41 which corresponds to the appropriate position of the belt carrier at either the "A" pillar or the "B" pillar. However, the selected relay is not energized unless a timer in control electronics 35 is activated by a trigger event over lines 37. During the limited time period initiated by a trigger, control electronics 35 energizes the selected relay over corresponding control line 42 or 43 causing the selected relay to output a voltage +V, supplied as shown, to energize motor 44. Movement of the belt carrier to the end of track at the desired position causes the opening of a corresponding limit switch which in turn causes control electronics 35 to deenergize the relay.

In the event that the seat occupant adjusts the seat while the motor is energized, control electronics 35 receives a seat adjust signal on line 38. The output of the timer is inhibited for as long as the seat adjust signal is being received. Therefore, the motor is deactivated during the seat movement.

When the occupant releases the seat adjustment lever or switches, the seat adjust signal turns off. In response to the turning off of the seat adjust signal, control electronics 35 restarts or retriggers the motor timer to allow the belt carrier to move to the selected position.

The passenger side of the passive restraint system is substantially identical to the driver side. Control electronics 35 is connected to a pair of relays 50 over control lines 47 and 48. Relays 50 are connected to an "A" input and "B" input of a passenger side belt motor 51 which provides motive power to a passenger side belt carrier 52. Limit switches 53 are provided for contact with passenger side belt carrier 52 at its forward and rearward positions.

Figure 3:
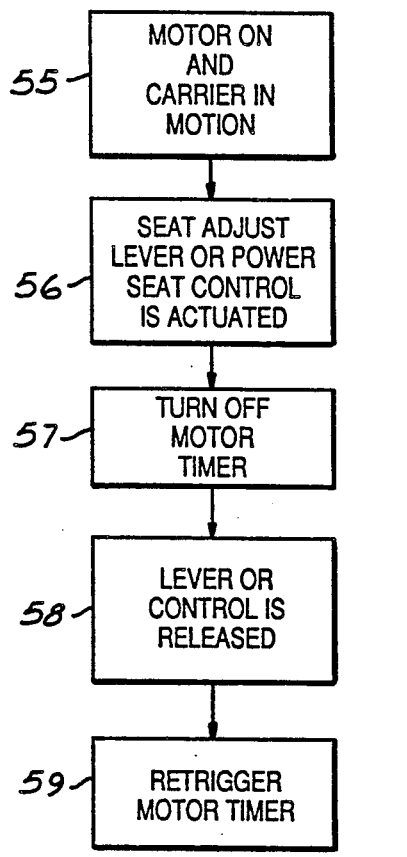
FIG. 3 is a flow chart illustrating operation of a passive restraint system according to the present invention.

The operation of the passive restraint system of FIG. 2 will be further described in connection with the flowchart in FIG. 3. In step 55, a relay has been selected and activated based on monitored conditions and a trigger event. Therefore, the belt motor is on and the belt carrier is in motion. In step 56, the seat occupant has initiated an adjustment of the seat position by turning a manual lever or by activating a power seat control. A seat adjust signal is generated so that the motor timer is turned off in step 57. Belt movement is inhibited until the lever or control is released by the occupant in step 58. The motor timer is retriggered in step 59.

Figure 4:
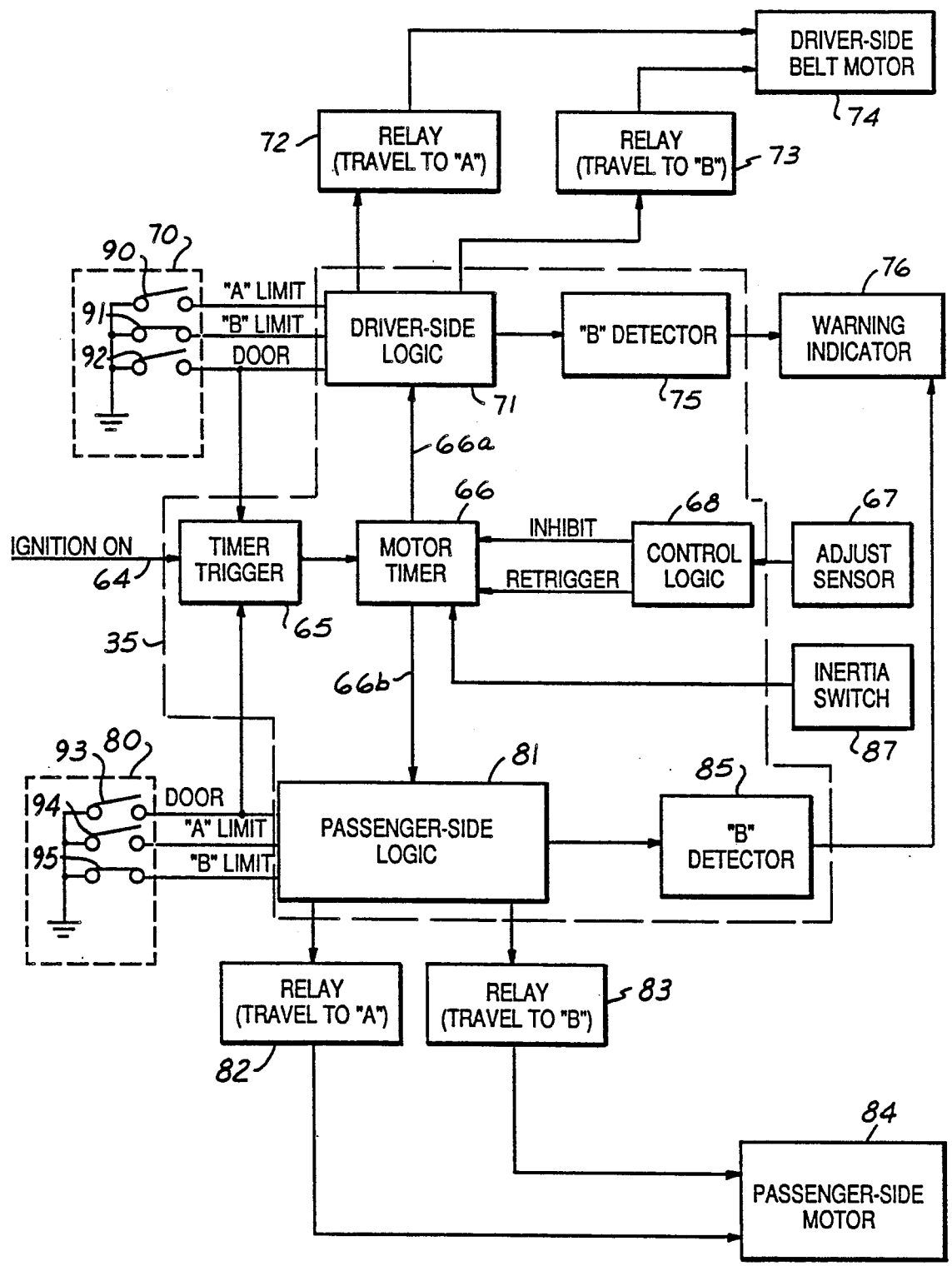
FIG. 4 is a detailed schematic, block diagram showing the electronic motor control system of the present invention.

Referring to FIG. 4, the electrical portion of the passive restraint system of the present invention is shown in greater detail. Control electronics module 35 includes a timer trigger 65 which receives an IGNITION ON signal on a line 64 when the ignition switch of the vehicle is in its run or start position. Timer trigger 65 may include a monostable multivibrator, for example. The output of timer trigger 65 is connected to an input of a motor timer 66. Motor timer 66 provides an output signal at its outputs 66a and 66b for a predetermined length of time (e.g., 7.5 seconds or some other period sufficient to allow full travel of the belt carrier) when it receives a trigger signal from timer trigger 65.

A seat adjustment sensor 67 is actuated by a vehicle occupant when a seat is being adjusted. The output of sensor 67 is connected to a control logic circuit 68. Control logic circuit 68 provides an inhibit signal to motor timer 66 to deactivate the timer output whenever sensor 67 is active. When sensor 67 transistions from an active to a nonactive state, control logic 68 provides a retrigger signal (by means of a monostable multivibrator, for example) to motor timer 66 to reactivate the timer output for the predetermined length of time.

The driver side portion of the passive restraint system includes sensors 70 to monitor the predetermined conditions for determining the direction and triggering of the driver side belt carrier. An "A" limit switch 90, a "B" limit switch 91, and a door switch 92 each have one side connected to ground and another side connected to a driver side logic block 71. Door switch 92 is further connected to timer trigger 65.

Driver side logic 71 is connected to motor timer output 66a and has outputs connected to relays 72 and 73 which are connected to driver side belt motor 74. Driver side logic 71 has another output connected to a "B" detector 75 for determining the failure of the belt carrier to reach the rearward position at the "B" pillar. "B" detector 75 is connected to a warning indicator 76 for signaling a vehicle occupant that the belt carrier has failed to reach the "B" position.

The passenger side portion of the passive restraint system includes sensors 80, including a passenger door position switch 93, an "A" limit switch 94, and a "B" limit switch 95. Switches 93, 94, and 95 each have one side connected to ground and another side connected to passenger side logic block 81. Passenger door switch 93 is further connected to timer trigger 65. Passenger side logic 81 is connected to motor timer output 66b. A relay 82 and a relay 83 receive output signals from passenger side logic 81 and provide power to a passenger side motor 84. A "B" detector 85 receives an input from passenger side logic 81 and provides an output to warning indicator 76.

An inertia switch 87 for detecting large accelerations of the vehicle as would occur during a collision provides an inhibit signal to motor timer 66.

In operation, logic blocks 71 and 81 respectively select a belt carrier position at either the "A" pillar or the "B" pillar (i.e., one of the corresponding relays 72 or 73 and 82 or 83 are selected) based on the positions of their corresponding sensor switches 70 and 80. However, the selected relay is not energized unless a trigger event occurs and a signal is received from motor timer 66. Thus, when the ignition is turned on or when a door opens or closes, timer trigger 65 sends a signal to initiate the timing of motor timer 66.

When either the appropriate limit switch is opened by the belt carrier or motor timer 66 times out, the logic block 71 or 81 turns off the relay which had been energized. If motor timer 66 times out without the opening of the appropriate limit switch, the appropriate logic block 71 or 81 provides a signal to corresponding "B" detector 75 or 85. Upon receipt of the signal, "B" detector 75 or 85 energizes a warning indicator 76 until the stalled condition is corrected.

Inertia switch 87 senses the occurrence of a collision and inhibits the operation of motor timer 66. Thus, during a collision, the belt carriers will not be allowed to move no matter what the sensed conditions are, thus protecting the vehicle occupants.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A passive restraint system for a vehicle comprising:
   a track extending between a forward position and a rearward position;
   a torso belt for restraining an occupant of said vehicle;
   a retractor having one end of said torso belt spooled thereon;
   a carrier movable in said track and connected to the other end of said torso belt;
   a carrier motor for causing movement of said carrier;
   relay means connected to said carrier motor for providing electrical power to said carrier motor in a manner to cause selectable movement of said carrier toward either one of said positions;
   logic means coupled to said relay means for controlling the direction of said movement depending on predetermined conditions;
   motor timer means coupled to said relay means for establishing a limited time period during which said carrier motor can be energized and for causing said relay means to remove electrical power from said carrier motor after said carrier motor has been energized for said limited time period; and
   seat adjust logic means coupled to said motor timer means for terminating said limited time period whenever said seat is being adjusted and for restarting said limited time period when adjustment of said seat ceases.

2. The system of claim 1 further comprising:
   timer trigger means coupled to said motor timer means for sensing predetermined events and for initiating said limited time period in response to the occurrence of a predetermined event, said predetermined events including the activation of a vehicle ignition and the opening and closing of a vehicle door.

3. The control of claim 1 further comprising: seat adjust sensor means coupled to said seat adjust logic means and adapted to be coupled to said seat for sensing whether said seat is being adjusted and for providing a seat adjust signal to said seat adjust logic means.

* * * * *